US010733135B2

(12) United States Patent
Liu et al.

(10) Patent No.: US 10,733,135 B2
(45) Date of Patent: Aug. 4, 2020

(54) UNIVERSAL SERIAL BUS NETWORK SWITCH

(71) Applicant: Futurewei Technologies, Inc., Plano, TX (US)

(72) Inventors: Fangping Liu, San Jose, CA (US); Xiaogang Zhu, Santa Clara, CA (US); Serhat Nazim Avci, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 194 days.

(21) Appl. No.: 15/477,792

(22) Filed: Apr. 3, 2017

(65) Prior Publication Data

US 2018/0285308 A1    Oct. 4, 2018

(51) Int. Cl.
*G06F 13/42*    (2006.01)
*G06F 13/40*    (2006.01)
*G06F 13/38*    (2006.01)

(52) U.S. Cl.
CPC ........ *G06F 13/4282* (2013.01); *G06F 13/385* (2013.01); *G06F 13/404* (2013.01); *G06F 13/4022* (2013.01); *G06F 2213/0026* (2013.01); *G06F 2213/0042* (2013.01)

(58) Field of Classification Search
CPC .................................................. G06F 13/4022
See application file for complete search history.

(56) References Cited

U.S. PATENT DOCUMENTS

| 6,393,483 | B1 * | 5/2002 | Latif .................. H04L 41/0668 370/230 |
| 6,600,739 | B1 | 7/2003 | Evans et al. |
| 6,601,109 | B1 * | 7/2003 | Bealkowski ............ H04L 12/44 709/238 |
| 7,685,334 | B2 * | 3/2010 | Bryan ..................... G06F 3/061 700/214 |
| 2006/0227759 | A1 | 10/2006 | Bohm et al. |

(Continued)

FOREIGN PATENT DOCUMENTS

WO    WO-2007/121344 A1    10/2007

OTHER PUBLICATIONS

"Universal Serial Bus 3.1 Specification", Revision 1.0, Copyright (c) 2007-2013, Hewlett-Packard Company, Intel Corporation, Microsoft Corporation, Renesas Corporation, ST-Ericsson, and Texas Instruments, (Jul. 26, 2013), 635 pgs.

(Continued)

*Primary Examiner* — Henry Tsai
*Assistant Examiner* — Juanito Borromeo
(74) *Attorney, Agent, or Firm* — Schwegman Lundberg & Woessner, P.A.

(57) ABSTRACT

A Universal Serial Bus (USB) switch includes a host port and a plurality of USB device ports. Each USB device port is configured to be coupled to a respective plurality of USB devices. A USB interface is coupled to the host port. A switch matrix is coupled between the USB interface and the plurality of USB device ports and is configured to switch the USB interface to one of the plurality of USB device ports. A switch controller is coupled to the plurality of USB interfaces, the host port, and the switch matrix. The switch controller is configured to control operation of the USB switch.

19 Claims, 12 Drawing Sheets

(56) References Cited

U.S. PATENT DOCUMENTS

2010/0077126 A1* 3/2010 Huang ................. H04L 49/101
　　　　　　　　　　　　　　　　　　　　　　710/316
2010/0277145 A1 11/2010 Krishna

OTHER PUBLICATIONS

"International Application Serial No. PCT/CN2018/079119, International Search Report dated Jun. 15, 2018", 4 pgs.
"International Application Serial No. PCT/CN2018/079119, Written Opinion dated Jun. 15, 2018", 4 pgs.

* cited by examiner

UNIVERSAL SERIAL BUS NETWORK SWITCH

FIELD OF THE INVENTION

The present disclosure is related to a Universal Serial Bus (USB) and, in particular, to addressing a greater number of USB devices than allowed by the number of addressing bits.

BACKGROUND

According to the USB standard, the address field for addressing a USB port is limited to seven bits. This limits a USB host to connecting to no more than 127 devices (i.e., $2^7=128$ minus one allocated for enumeration). As computer systems become more complex, this limitation can cause problems with a computer that needs to connect to greater than 127 USB devices.

Once solution would be to change the standard to increase the number of address bits. However, older devices have been built to the seven bit address standard and would be unable to use devices that were designed to a new standard.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

One example includes a port switch including a host port configured to connect to a host, a plurality of device ports, each device port coupleable to a plurality of devices, a switch matrix coupled between the host port and the plurality of device ports, the switch matrix configured to selectively switch the host port to one of the plurality of device ports, and a switch controller coupled to the host port and the switch matrix, the switch controller configured to acknowledge a host request for a device port if the device port is available, transmit a port listing of available device ports to the host if the requested device port is not available, control the switch matrix to selectively connect the device port to the host port in response to the host request, and update a switch table representing the switch connection of the device port to the host port.

In another example, a Universal Serial Bus (USB) switch in a network of switches includes a plurality of host ports each configured to be coupled to a respective host, a plurality of USB device ports, each USB device port configured to be coupled to a respective plurality of USB devices, a plurality of USB interfaces, each USB interface coupled to a different respective host port and comprising a hub repeater to repeat a signal from its respective host port a switch matrix and a transaction translator to translate between a lower USB standard and a higher USB standard, the switch matrix coupled between the plurality of USB interfaces and the plurality of USB device ports and configured to selectively switch a USB interface to a USB device port, and a switch controller coupled to the plurality of USB interfaces, the plurality of host ports, and the switch matrix, the switch controller comprising a processor coupled to non-transitory memory comprising instructions wherein the processor is configured to execute the instructions to acknowledge a requesting host request for the USB device port if the USB device port is available, transmit a port listing of available USB device ports to the requesting host if the USB device port is not available, control the switch matrix to connect the USB device port to the host port of the requesting host through its respective USB interface, and update a switch table representing the switch connection of the USB device port to the host port of the requesting host.

In yet another example, a method for connecting a USB network switch to a host includes detecting connection to the host at a host port, receiving a first connect port request for connecting the host port to a first USB device port of a plurality of USB device ports, transmitting an acknowledgement if the first USB device port is available, switching the host port to the first USB device port if the first USB device port is available, transmitting a list of available ports if the first USB device port is not available, receiving a second connect port request if the first USB device port is not available, the second connect port request comprising one of: a second USB device port from the list of available ports or a port disconnect, and updating a USB switch table with the switch to the first USB device port, the second USB device port, or the port disconnect.

DETAILED DESCRIPTION

The USB network switch provides the ability for a host to connect to up to 126 USB devices without an update of the USB addressing standard for USB devices. In another embodiment, a plurality of hosts can be coupled to the USB network switch and each host can have access up to 126 USB devices.

Figure 1:
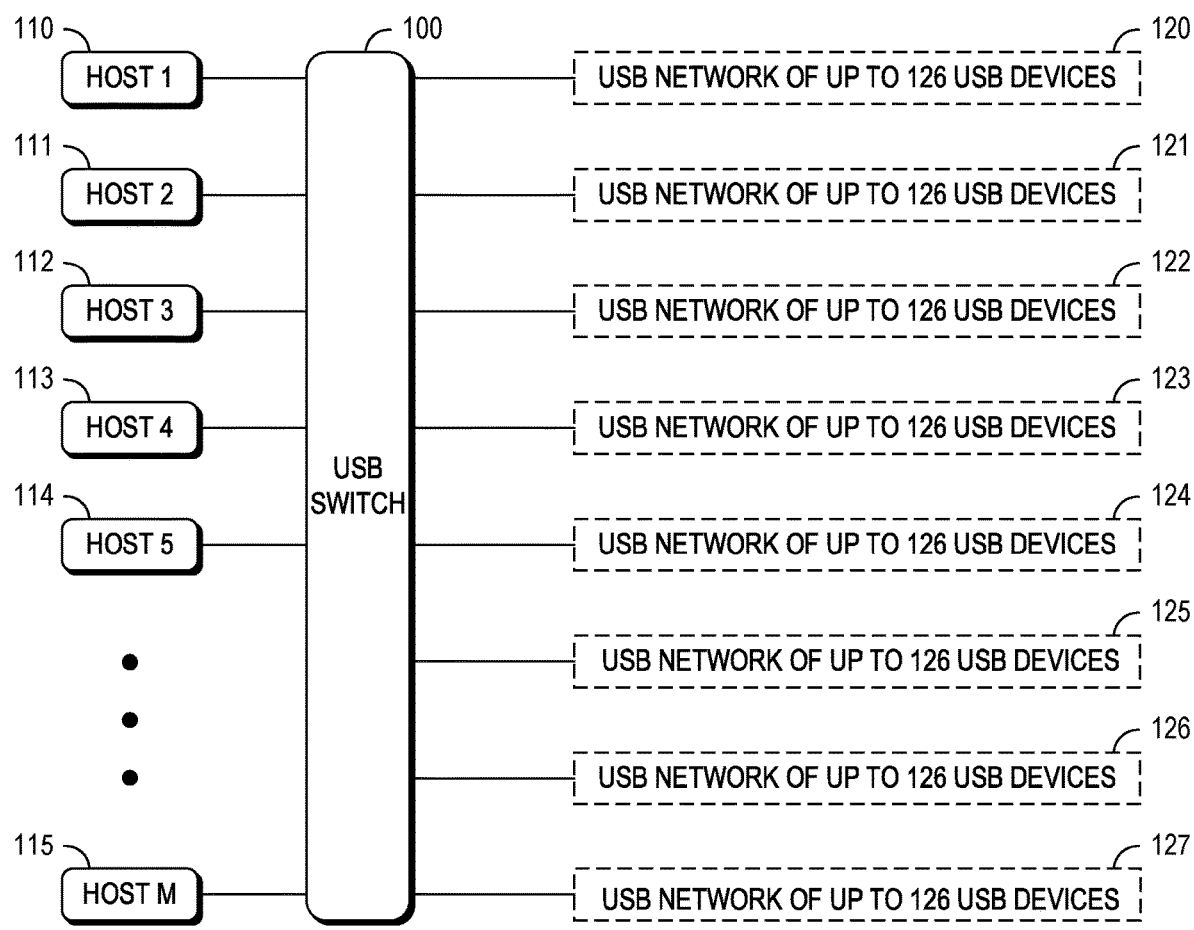
FIG. 1 is a block diagram of a USB switch network, according to an example embodiment.

FIG. 1 is a block diagram of a USB switch network, according to an example embodiment. The network includes a USB switch 100, one or more hosts 110, 111, 112, 113, 114, 115 (e.g., Host 1-Host m), and a plurality of USB networks 120, 121, 122, 123, 124, 125, 126, 127.

Figure 2:
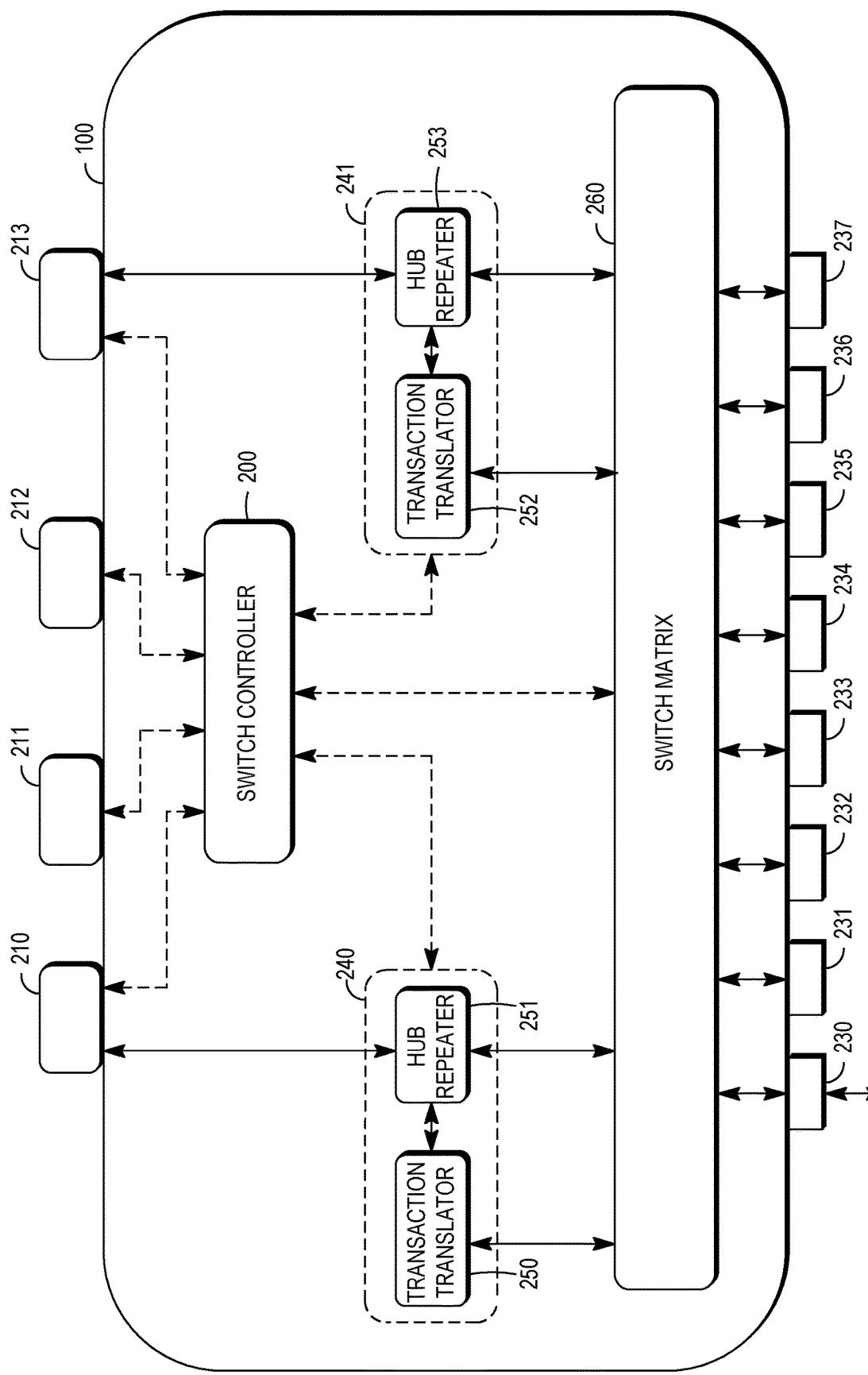
FIG. 2 is a block diagram of a USB network switch, according to an example embodiment.

Host ports of the USB switch 100 are coupled to one or more hosts 110-115 (e.g., Host 1-Host m). Each host port is coupled to one host 110-115 as shown in FIG. 2 and described subsequently. A host may be a computer, controller or other electronic device that can be connected to and use the USB switch 100 for switching purposes. FIG. 11 illustrates an example of a host.

In the subsequent embodiments, the host 110-115 is responsible for initiating transfer of data to or from a USB device. The host 110-115 determines what data is needed and which USB device contains the desired data and transmits a command to that particular device to initiate the transfer of the data from the USB device.

A USB device may be defined as any electronic device coupled to a USB switch for the purpose of sharing data with a host. For example, a USB device may be a flash memory device, a solid state drive (SSD) a hard disk drive (HDD), or a controller.

Each USB network 120-127 can include up to one hundred twenty-six USB devices. Thus, each USB network 120-127 is connected to a different port of the USB switch 100 and that particular network is now addressable by the seven bit address of the USB standard. Those devices in each network 120-127 are identified one-by-one with a process called enumeration. Those devices are physically connected to the host that is configured by the USB switch 100. The details of enumeration are described in the USB standards.

FIG. 2 is a block diagram of a USB network switch 100, according to an example embodiment. In the interest of brevity and clarity, the USB network switch 100 of FIG. 2 is shown with only four host ports 210, 211, 212, 213 and eight USB network ports 230, 231, 232, 233, 234, 235, 236, 237. However, one of ordinary skill in the art would realize that the switch 100 can have greater numbers of both the host ports 210-213 and the USB network ports 230-237 and still operate as disclosed herein.

The switch 100 includes a switch controller 200, one or more of USB interfaces 240, 241, and a switch matrix 260. The switch controller 200 is coupled to each of the host ports 210-213, the USB interfaces 240, 241, and the switch matrix 260. The switch controller 200 is configured to control operation of the USB switch 100. The controller 200 may be implemented as a field programmable gate array (FPGA), an application specific integrated circuit (ASIC), a dedicated central processing unit (CPU), or any other controller circuitry and may include memory to store a switch table, as described subsequently. An example of a switch controller 200 is illustrated in FIG. 15.

Each of the USB interfaces 240, 241 includes a transaction translator 250, 252 and a hub repeater 251, 253. The operation of the USB interfaces 240, 241 is controlled by the switch controller 200. In the interest of clarity and brevity, only two USB interfaces 240, 241 are shown. However, in an embodiment, there are the same number of USB interfaces 240, 241 as host ports 210-213. Each USB interface 240, 241 is coupled to a different, respective host port 210, 213.

The hub repeater 251, 253 comprises a driver circuit to provide extra current capabilities for transmission of data to and from a particular network of USB devices. The driver circuit of the hub repeater 251, 253 also provides extra current for data received from the particular network of USB devices to be transmitted to a particular host connected to one of the host ports 210-213. Operation of the hub repeater 251, 253 is transparent to operation of the USB network switch 100. The hub repeater 251, 253 is well known in the art and discussed further in the USB standards documents.

During normal transmissions, data traffic received from a host port 210-213 is broadcast to all devices attached to a particular selected USB device port 230-237. Each USB device coupled to that particular selected USB device port 230-237 is able to select its own data traffic by the USB device address embedded in the transmission. Data received from a downstream port is forwarded to the requesting host port 210-213 only. The switch matrix 260 is configured as a circuit switch (it can be a crossbar) based on the mapping between host ports and downstream ports. The switch controller 200 also keeps track of the mapping and makes the requested updates. In other words, data that is sent by a particular host 210-213 is received by all USB devices on a selected port 230-237 and data sent by a USB device is received by the requesting host but not by the other hosts 210-213.

The transaction translator 250, 252 automatically recognizes and provides translation of data from one USB standard to another USB standard. For example, the requesting host may only have USB 2.0 drivers while one or more of the USB devices connected to the selected USB device port. The port selection is done by the request of the hosts. If a specific device port is available, it is assigned per host-request. 230-237 may support USB 3.0 operation. The transaction translator 250, 252 translates between the lower standard (e.g., USB 2.0) and the higher standard (e.g., USB 3.0). The transaction translators 250, 252 may be multi transaction translators (Multi-TT) that provide more transaction translators such that bottlenecks are avoided. The transaction translator function is well known in the USB art and discussed in greater detail in the USB standards documents.

The switch matrix 260 includes a plurality of selectable connecting elements (e.g., transistors) that can be selectively activated by the switch controller 200 to couple a selected USB network port 230-237 to the requesting host port 210-213 through its respective USB interface 240, 241.

In operation, once a host is connected to the switch 100, the host performs an enumeration process as a USB device. If there are multiple switches 100 that a host can connect to, the host connects to each switch 100 as if each switch 100 is a different USB device and enumerates each one. The switch may be defined as a new device class and a new class proposed for it or FFh as the vendor specific device class may be used.

USB enumeration is the process of detecting, identifying and loading drivers for a USB device. This involves a mixture of hardware techniques for detecting something is present (e.g., pulled up pins) and software to identify what device (e.g., USB 2.0, USB 3.0) has been connected. The enumeration assigns a different address to each detected USB device. This address is then used in the address field of packets broadcast to the USB devices so that only the device with that particular address in the address field reads the packet. The other USB devices ignore packets that do not contain their assigned address. Once the host is connected to the switch 100 and enumerates the switch 100, the host issues a request (e.g., CONNECT_PORT) to connect to a specific port of the switch 100 or to disconnect from its current port. Connecting to a specific port can be carried out at the application level. For example, a host might refer to a centralized name server type determine which port to connect to. Alternatively, the host can scan the device ports and get to know their contents on its own. If the requested port is available, the switch 100 will send an acknowledgement (e.g., ACK) back to the host. The switch controller 200 updates a USB switch table with the host identification and the port now assigned to that particular host (e.g., requesting host). The host may then transmit data traffic to that particular port with the address of the selected device, found during enumeration, in the address field of the data packets. The enumeration of the devices behind the switch starts as soon as the switch matrix is configured to connect the host port to the related device port. Since it is a circuit switch, the host recognizes and enumerates all of these new USB devices one-by-one as if they are physically attached.

If the requested port is not available, the switch 100 transmits a bitmap representing a list of available switch ports back to the host. The host may then select a port from this list of available ports. The host transmits this selected port in another port connection request and the operation continues as outlined previously.

If the host is already operating with a selected port, the host may decide to disconnect from that port. This may be accomplished by transmitting a connection request to a predetermined port (e.g., Port 0) that tells the switch controller 200 that the port currently being used by the host can be disconnected and the USB switch table updated to remove the assigned port from that host.

One example of this operation is illustrated in FIGS. 5-14 as described subsequently. This example is for purposes of illustration only as other ways to implement the operation of the USB network switch may be realized.

The number of USB devices connectable to the USB switch 100 may be changed by either changing the number of ports on the USB switch 100, changing the number of nested levels of USB switches 100, or connecting the each host to multiple switches.

Figure 3:
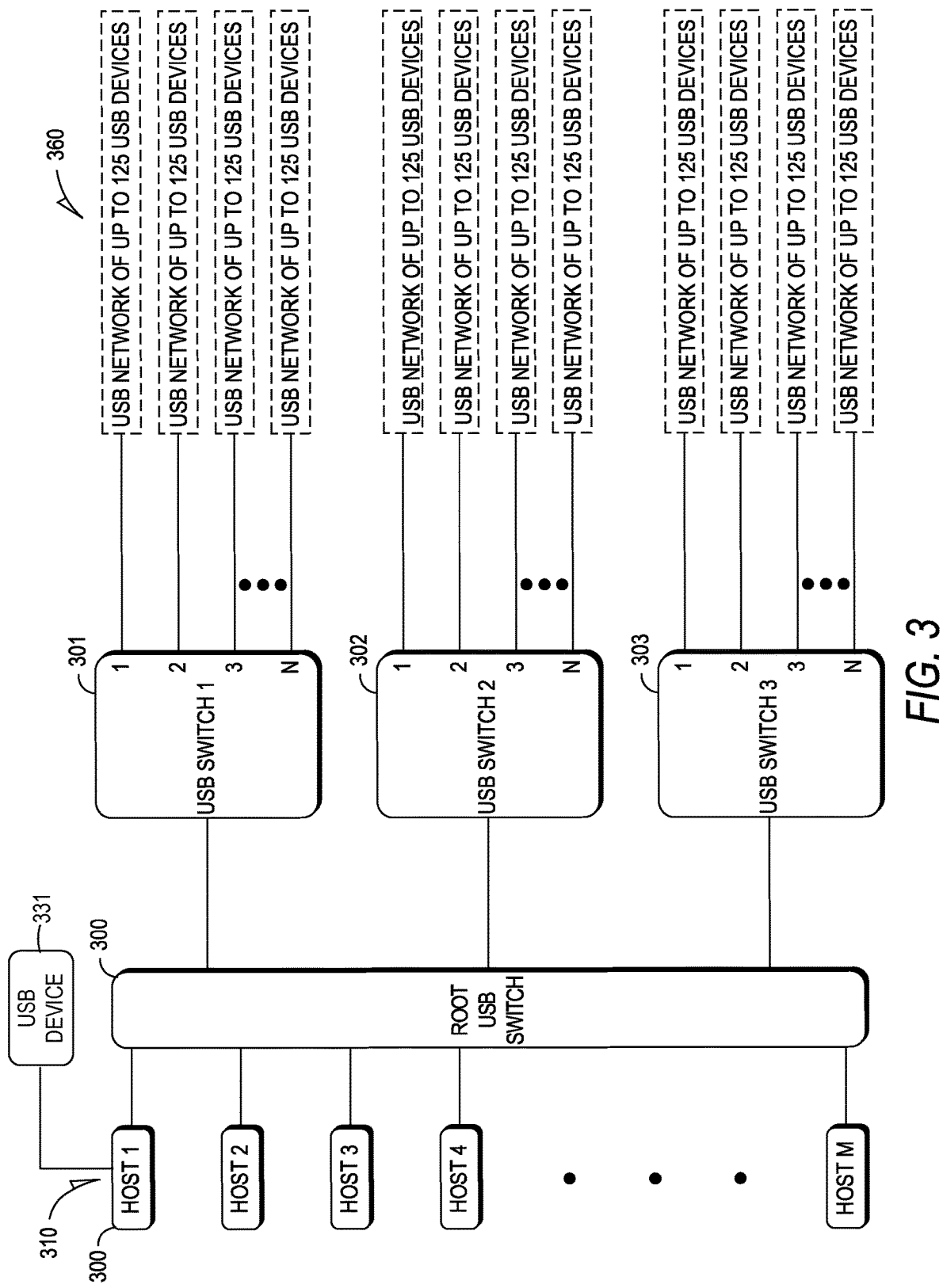
FIG. 3 is a block diagram of another USB switch network, according to an example embodiment.

FIG. 3 is a block diagram of another USB switch network, according to an example embodiment. This figure illustrates another embodiment using the USB network switch 100 that increases the number of nested levels of USB network switches. This enables the host to address even greater numbers of USB devices while still adhering to the limitation of seven bits for the USB address field.

In this embodiment, a root USB network switch 300 is coupled to a plurality of hosts (Host 1-Host m) 310, each host being coupled to a different host port of the USB network switch 300. The root USB network switch 300 is the USB network switch 100 of FIG. 2.

A second level of USB network switches 301, 302, 303 is coupled to the USB device ports of the first USB network switch 300. The host ports on the second level of USB network switches 301-303 are coupled to the USB device ports of the first USB network switch 300. Each USB device port of the second level of USB network switches 301-303 may be coupled to up to 125 USB devices. In an embodiment, USB network switches 301-303 are identical to root USB network switch 300. Any one or more of the hosts 310 may be coupled to a USB device without the switch 300. For example, as shown, host 330 is coupled to a non-switch USB device 331 that may be a flash memory device, a scanner, or some other USB device.

With p number of levels of USB network switches, each network switch having n number of USB device ports, this embodiment provides each host 310 with the capability of accessing $n^{p0}*(127-p)$ devices. Since p is the number of levels in the topology, on each level, a host is connected to a separate switch so that it consumes an address for each switch. There remains (127-p) for the rest of the downstream devices. In the illustrated example of FIG. 3, since one address (of the 127 addresses) is assigned to the root switch 300 and another address is assigned to one of the switches 301-303, there are now 125 addresses available per port.

Figure 4:
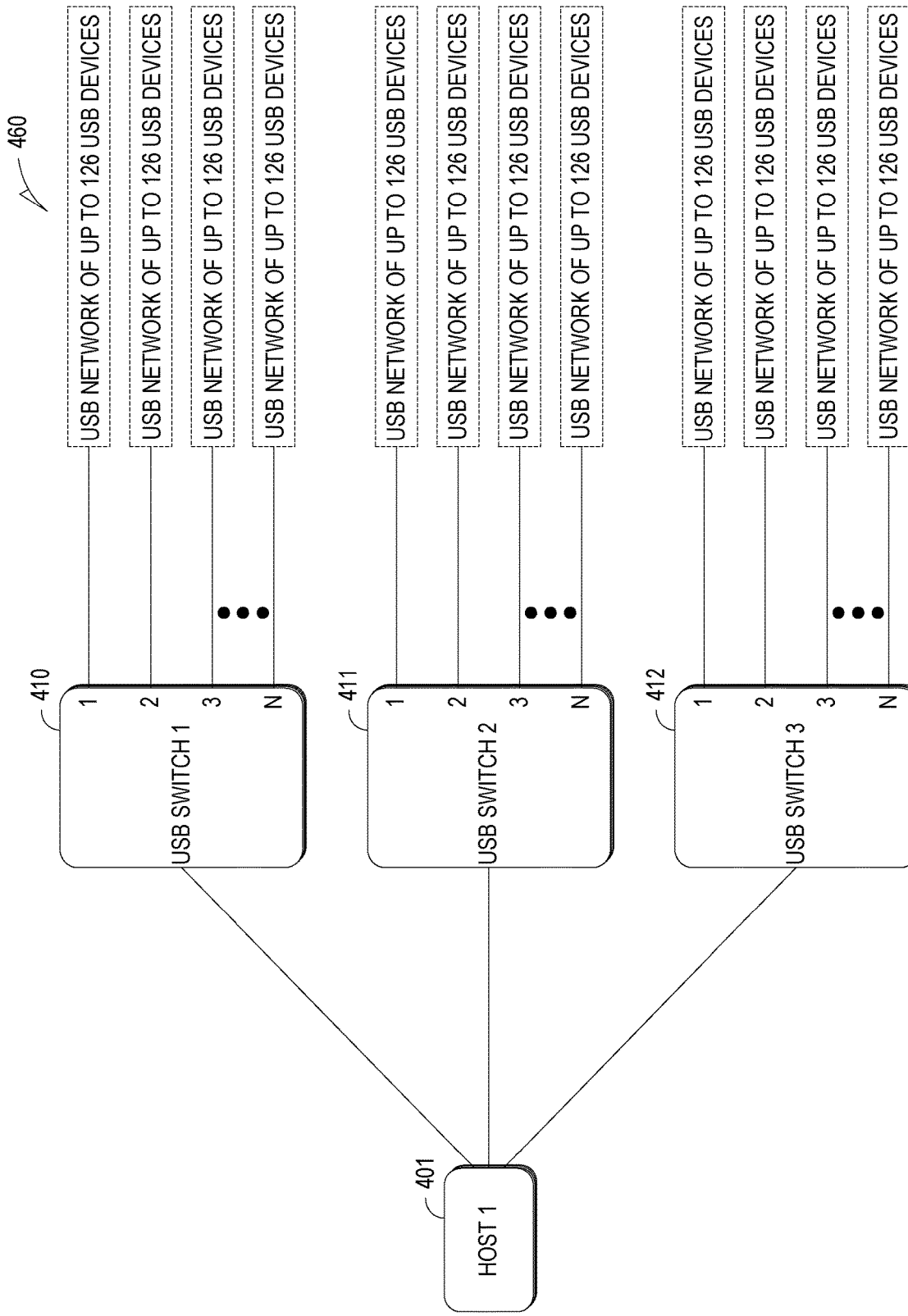
FIG. 4 is a block diagram of yet another USB switch network, according to an example embodiment.

FIG. 4 is a block diagram of yet another USB switch network, according to an example embodiment. This embodiment includes only one host 401 that is coupled to the host inputs of a plurality of USB network switches 410, 411, 412 (e.g., three switches). Each USB network switch 410-412 includes n number of USB device ports and each USB device port may be coupled to up to 126 USB devices 460 (i.e., 127—one address for one of the USB network switches 410-412). Thus, this embodiment provides each host with the capability of accessing $q*n*126$ where q is the number of switches to which the host is directly connected.

Figure 5:
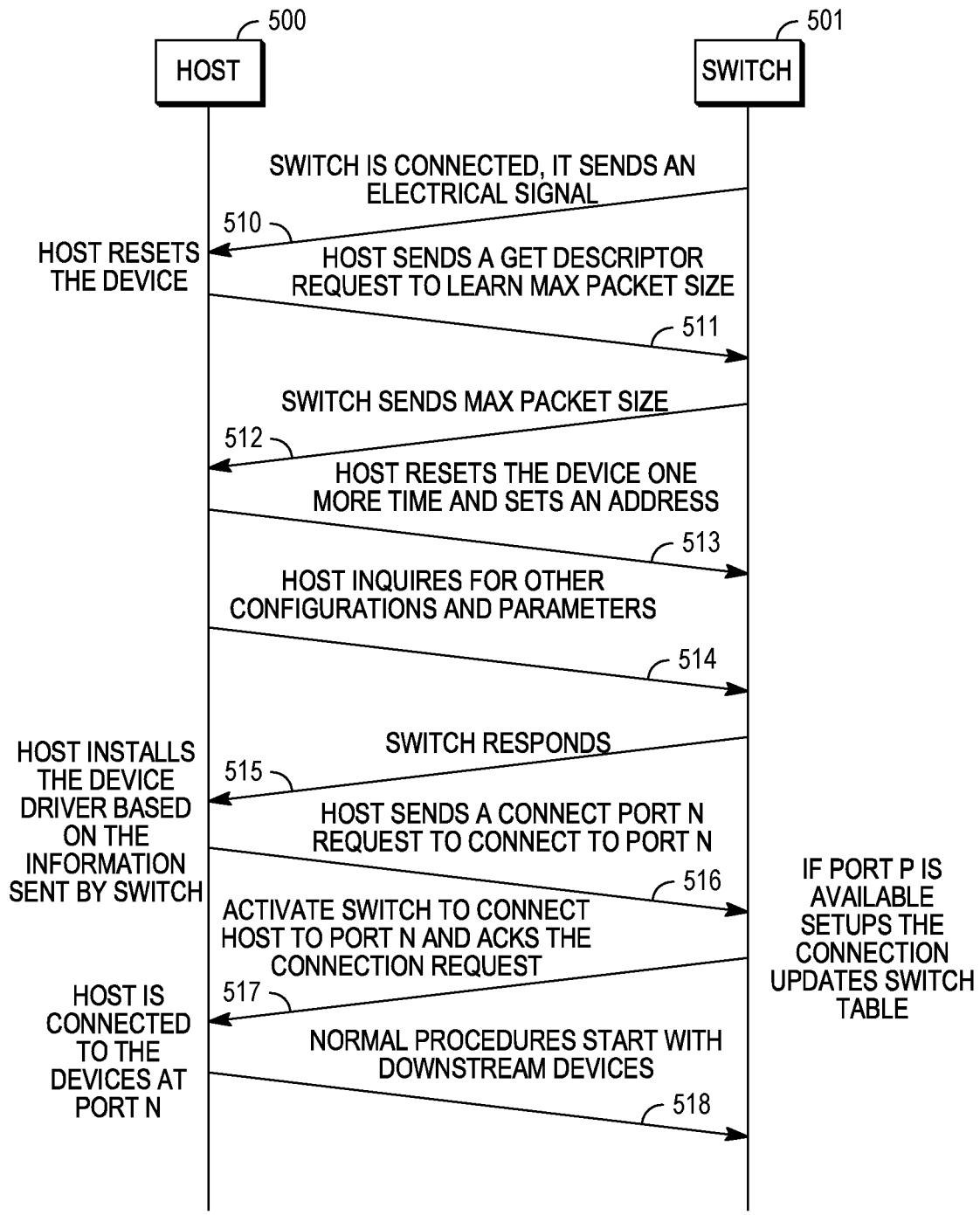
FIG. 5 is a flow diagram of a method for setting up the USB network switch, according to an example embodiment.

FIG. 5 is a flow diagram of a method for setting up the USB network switch, according to an example embodiment. This method assumes that the host 500 is not connected to any ports yet and that the requested port is available.

The communication is between the host 500 and the USB network switch 501. It can be seen that the USB network switch 501 is treated like a USB device by the host 500 even though the switch 501 can have a greater number of USB devices coupled to it than is allowed by the USB addressing standards.

The host 500 detects the connection of the USB network switch 501 when the switch 501 sends an electrical signal 510 to the host 500. This signal may be simply a voltage (e.g., Vcc) on a one of the connector pins. The host 500 resets a USB device connected to the USB network switch 501 and sends a request (e.g., GET_DESCRIPTOR) to the switch 501 to learn the maximum packet size 511. Depending on the version of USB standard that the USB device (e.g., the USB switch 501) implements, the packet size that it uses may vary. The switch 501 responds back 512 with the maximum packet size with which it will communicate.

The host 500 resets the USB device (e.g., the USB switch 501) again and transmits an address 513 to the switch 501. This is the enumeration process as discussed previously. The host 500 has now assigned a USB address to the switch 501 that is treated like a USB device.

The host 500 transmits a query 514 to the switch 501 for other USB configuration and parameters of the USB switch device 501. The USB configuration and parameters may be found in the USB standards documents. The switch 501 responds 515 with its specific configuration and parameters. For example, the configuration and parameters may include what the USB device is, the manufacturer name, what version of USB it supports, how many ways it can be configured, and/or the number of endpoints and their types. These are referred to in the USB standard as USB descriptors and may take the form of device descriptors, configuration descriptors, interface descriptors, endpoint descriptors, and string descriptors. USB endpoints may be defined as sources or sinks of data. In other words, endpoints may be referred to as the interface between the hardware of the USB device and the firmware running on the USB device.

Each USB device can only have one device descriptor. bDeviceClass field, idVendor field and idProduct fields can be used by the switch to tell the host that it is a switch with certain number of ports. The device descriptor includes information such as to what USB revision the device complies, the product and vendor identifications used to load the appropriate drivers, and the number of possible configurations the device can have. The number of configurations indicate how many configuration descriptors branches are to follow.

The configuration descriptor specifies values such as the amount of power this particular configuration uses, if the device is self or bus powered and the number of interfaces it has. When a switch 501 is enumerated, the host 500 reads the device descriptors and can make a decision as to which configuration to enable. The host 500 typically may only enable one configuration at a time.

The interface descriptor may be a header or grouping of the endpoints into a functional group performing a single feature of the device. There is no limitation as to having only one interface enabled at a time. A device could have one or more interface descriptors enabled at once.

Endpoint descriptors are used to describe endpoints other than endpoint zero. Endpoint zero is assumed to be a control endpoint and is configured before any descriptors are even requested. The host 500 will use the information returned from these descriptors to determine the bandwidth requirements of the bus.

String descriptors provide human readable information and are optional. If they are not used, any string index fields of descriptors is set to zero indicating there is no string descriptor available.

The host 500 may now send a request to connect 516 to a certain port in the switch 501. For example, the host 500 may send a CONNECT_PORT n request in order to connect to Port n of the switch. This information can be learned in the application level, such as using a centralized name server. The number of ports can be given to the host when sending the device descriptor. For example, in a field for idProduct field. The host downloads and installs the driver for that specific product id. The driver can then tell how many ports this switch 501 has. If Port n is available in the switch, the switch controller updates the switch connection table in memory with the fact that Host m is now assigned to Port n. One example of a switch connection table is illustrated in FIG. 6.

Figure 6:
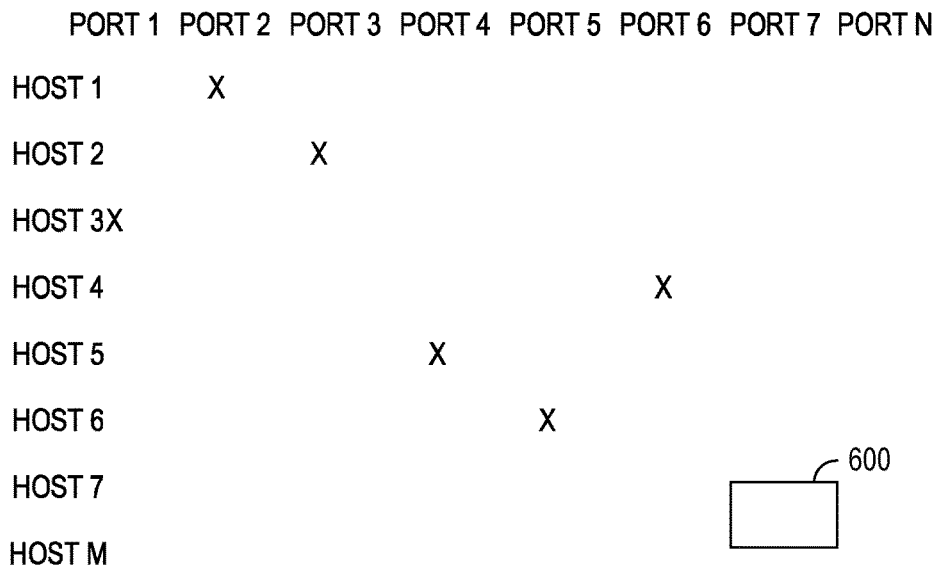
FIG. 6 is a diagram of a switch connection table, according to an example embodiment.

FIG. 6 is a diagram of a switch connection table, according to an example embodiment. The hosts Host 1-Host m are shown along the y-axis. The ports Port 1-Port n are along the x-axis.

This particular switch table shows that Host 1 has been assigned Port 2, Host 2 has been assigned Port 3, Host 3 has been assigned Port 1, Host 4 has been assigned Port 6, and Host 6 has been assigned Port 5. If the CONNECT_PORT 7 has been sent by Host 7, that port is currently available as indicated 600 and would be assigned to Host 7.

Referring again to FIG. 5, the switch 501 responds to the CONNECT_PORT n request with an acknowledgement (e.g., ACK) and the switch activates the proper switch of the switch matrix to connect the requesting host to Port n of the switch 501. The host 500 is now connected to the USB devices that are connected to Port n and, at 518, can now start normal procedures with the USB devices as if those network devices were manually (physically without a switch) connected to the host. The host 500 would typically enumerate the USB devices that are connected to the Port n to which it was just connected. The switch 501 provides the abstraction that the device is directly (physically) connected to the network of devices in the downstream port. The USB standards cover how the host enumerates multiple devices (up to 127) in different topologies irrespective of the topology.

The host knows which devices are behind each device port by referring to a centralized name server or by just scanning each device port one by one, or any other method.

Figure 7:
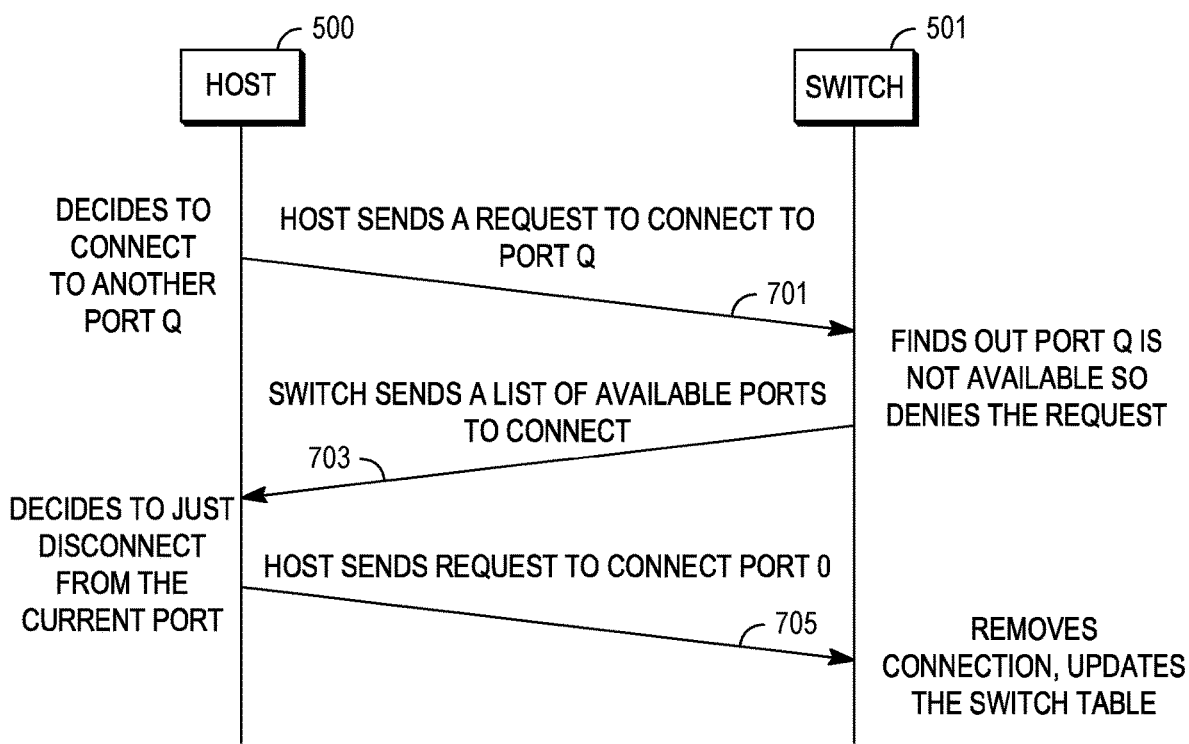
FIG. 7 is a flow diagram of a method for tearing down a port connection of the USB network switch, according to the embodiment of FIG. 5.

FIG. 7 is a flow diagram of a method for tearing down a port connection of the USB network switch, according to the embodiment of FIG. 5. This method assumes that the host 500 is already connected to a switch port and is trying to change ports or disconnect from the switch 501. This method is a continuation of the method illustrated in FIG. 5.

The host 500 is shown deciding to connect to Port q by sending a CONNECT_PORT q request to the switch 501 to connect to port q 701. The switch 501 checks the switch connection table in memory to determine that Port q is not available. The switch 501 denies the request by not acknowledging to request to the host 500. The switch 501 responds by sending a list of available ports 703 to the host 500. The host 500 determines to disconnect from the current port at this point and sends a request 705 to connect to a predetermined port (e.g., Port 0) that represents to the switch 501 that the current port assigned to the host 500 should be disconnected. For example, the host 500 may send a CONNECT_PORT 0 to the switch 501. The switch 501 then updates the switch connection table.

If the host 500 had decided to connect to another port instead of disconnecting, the host 500 would have selected a port (e.g., Port x) from the list of available ports sent by the switch 501. The host 500 could then have sent a CONNECT_PORT x request to the switch 501 and the process would continue as outlined in FIG. 5.

The connection request from the host to connect to one of the device network facing ports (CONNECT_PORT request is described later in the application) may be considered a USB control transfer in the USB standards. Control transfers are defined in the USB standard as comprising three transactions: setup, data (optional), and status. However, the present embodiments introduce a new request field in the CONNECT_PORT request packet to accomplish the request to connect to a particular port of the switch. The new CONNECT_PORT request is a hybrid control write/read transfer with an optional data transaction. CONNECT_PORT becomes a Control Transfer if the port is available. CONNECT_PORT becomes the Control Transfer, same as above, if the port is not available.

The setup transaction includes three packets 800, 801, 802 are aforementioned three packets including token, data, and handshake packets. The token packet 800 is the token packet that has a binary packet identification (PID) of 1101 followed by the USB device address and endpoint as was determined by enumeration of steps 510-515 on FIG. 5. The DATA packet will be a binary 0011 for the PID and uses a request field (e.g., binary Request or bRequest) that is not set out in the USB standard. The handshake packet is substantially similar to other USB control transfers.

Figure 10:
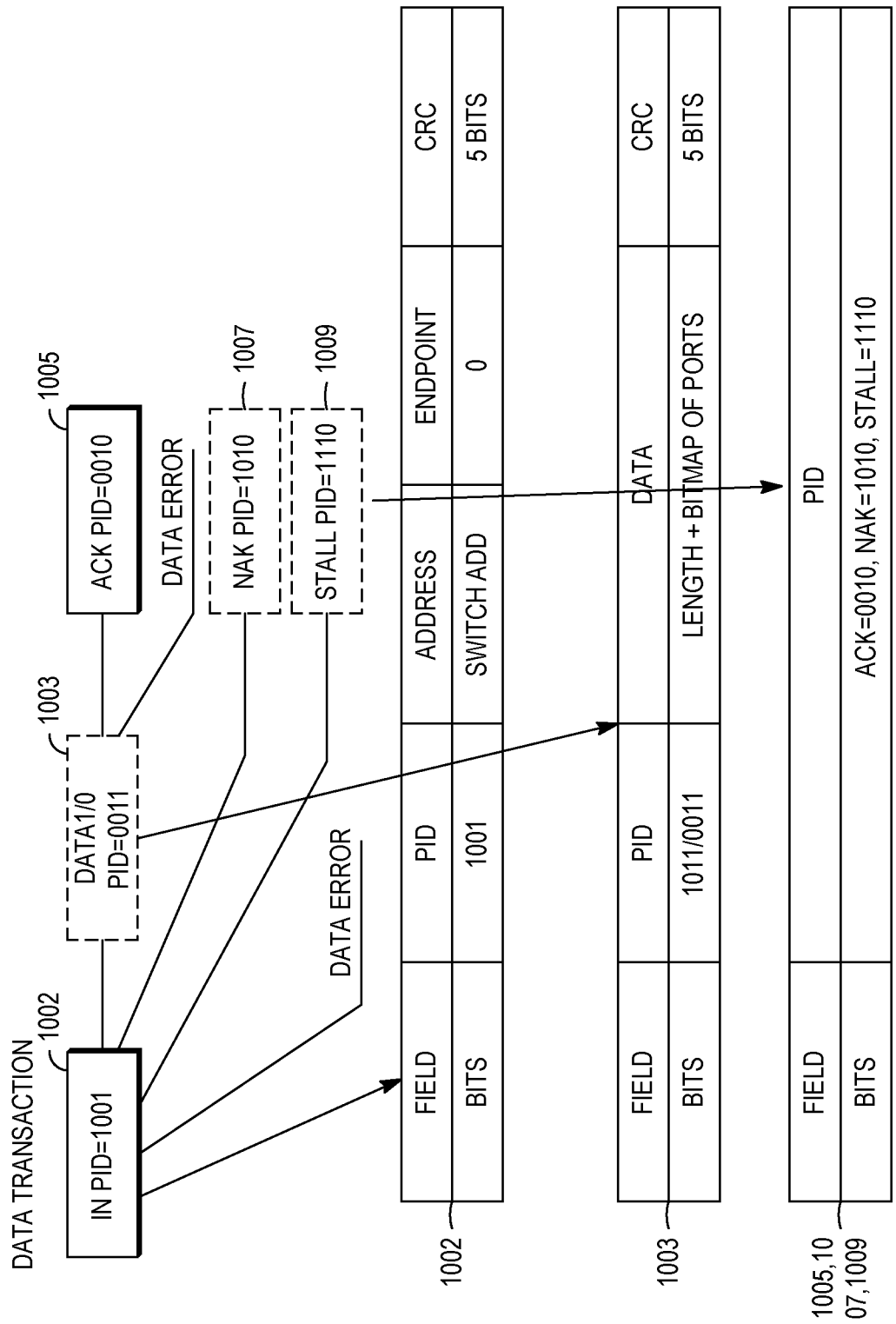
FIG. 10 is a Data Transaction for the CONNECT_PORT connection request if the port is not available, according to the embodiment of FIG. 8.
Figure 11A:
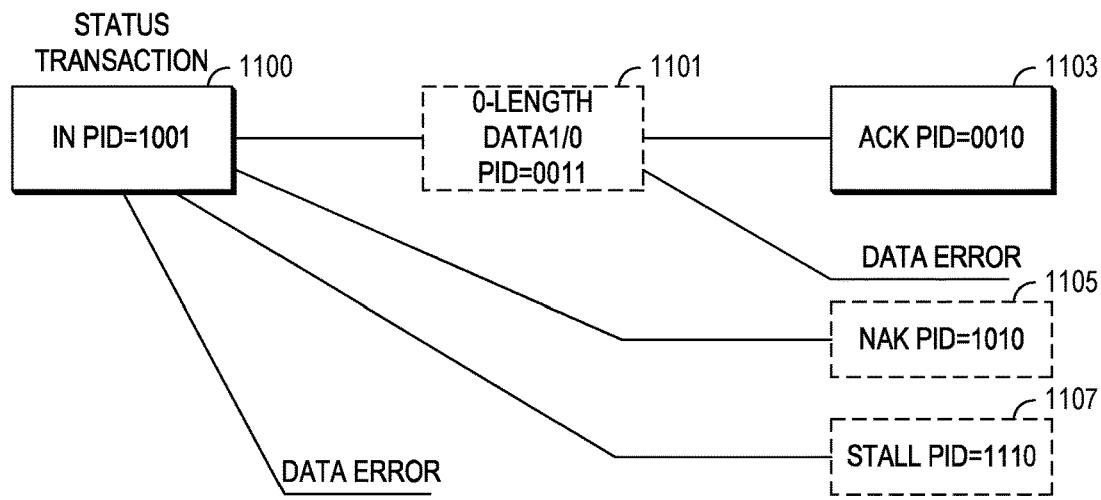
FIGS. 11A and B are Control Transfers, according to example embodiments.
Figure 11B:
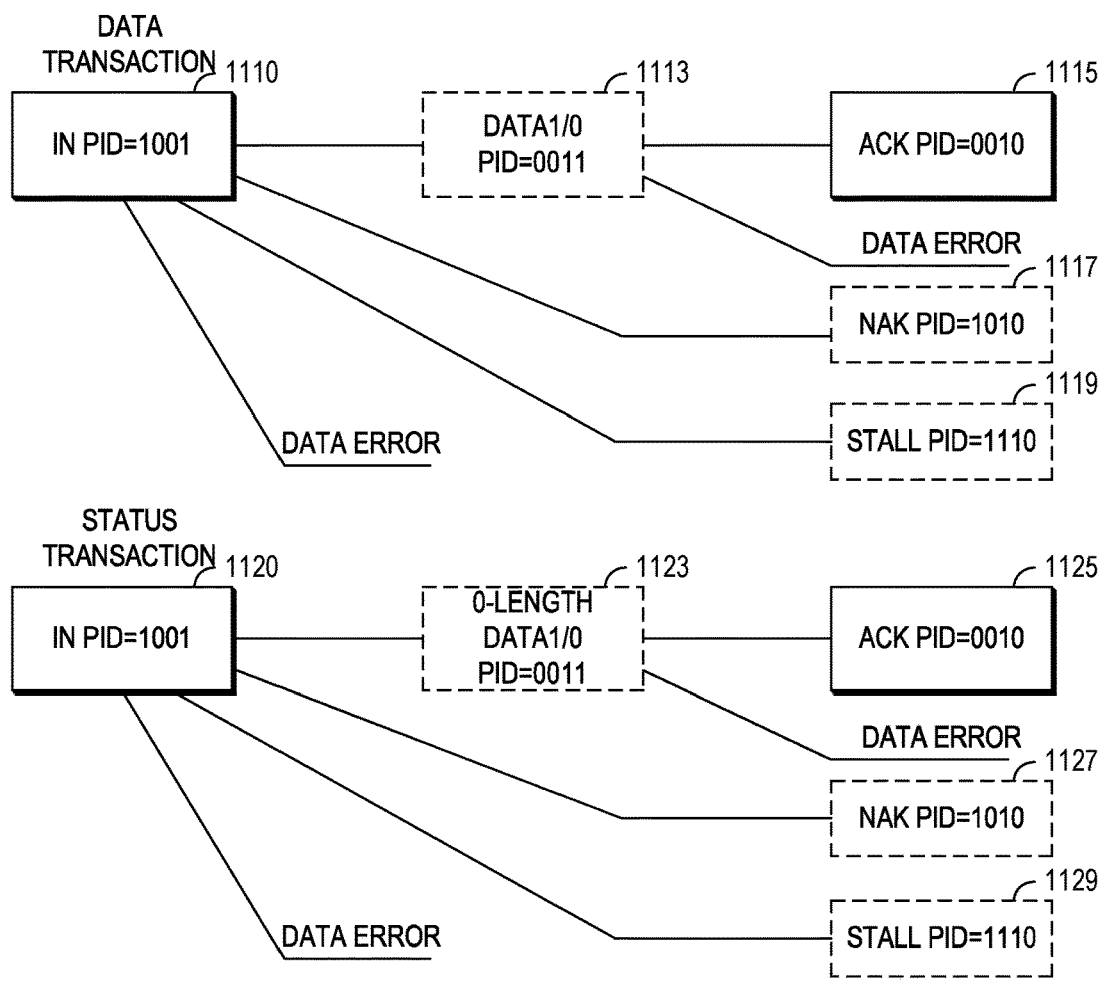

The optional data transaction also includes three packets including token, data, and handshake (see FIGS. 10 and 11B). The data token packet has a binary PID of 1001 followed by the address and endpoint as was determined by enumeration. The data packet has a binary PID of 1011 or 0011 for data 1 or data 0, respectively with the data field response the same as the standard request. The handshake packet is substantially similar to other USB control transfers.

The status transaction also comprises three packets including setup, data, and handshake. The token packet has a binary PID of 1001 or 0001 depending on if the status is IN or OUT, respectively. The PID is followed by the address and endpoint as determined by enumeration. A zero length packet will have a binary PID of 10011 or 0011 for data 1 or data 0, respectively. The handshake packet is substantially similar to other USB control transfers.

The CONNECT_PORT request with bmRequestType 0x03 that indicates that the recipient will be a switch and not a USB device, interface, or endpoint. The bRequest field of the present embodiments has a value of 13 that may be represented by the hexadecimal number 0x0D. The field wVALUE is the port number p that the host is requesting to connect with. If that port is available, the switch acknowledges with a 0-length DATA packet and an ACK packet. If the Port p is an unavailable port, the switch performs a data transfer to submit the list of available ports to the requesting host. If Port p is set to "0" (or some other predetermined port ID), the host is indicating that it wishes to disconnect from the current port. The fields wIndex and wLength are zero.

The CONNECT_PORT request comprises the following fields:

| Offset | Field | Size | Value | Description |
|---|---|---|---|---|
| 0 | bmRequestType | 1 | Bitmap | Characteristics of Request D7: Data Transfer Direction D6-5: Type (00) D4-0: Recipient(00011) |
| 1 | bRequest | 1 | Value | $13_{10} = 0x0D_H$, CONNECT_PORT request |
| 2 | wValue | 2 | Value | Requested port to connect to |
| 4 | wIndex | 2 | Index or Offset | Zero |
| 6 | wLength | 2 | Count | Zero |

Figure 8:
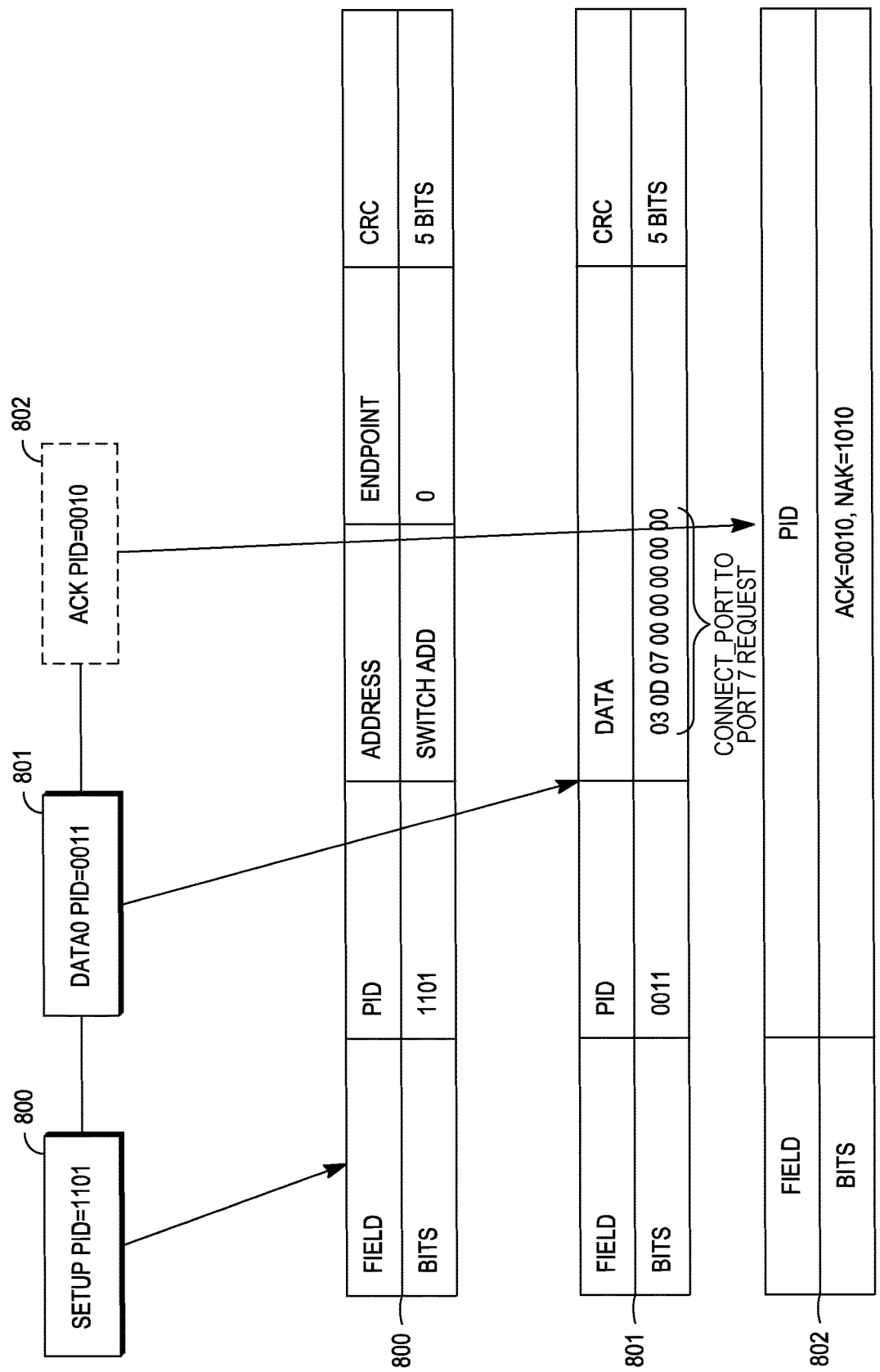
FIG. 8 is a diagram showing the fields for a CONNECT_PORT setup transaction, according to an example embodiment.

FIG. 8 is a diagram showing the fields for the CONNECT_ PORT setup transaction, according to an example embodiment. In the transaction of FIG. 8 as well as subsequent figures, solid line boxes are packets transmitted by the host and dashed line boxes are packets transmitted by the switch.

The CONNECT_PORT transaction begins with the SETUP packet 800. The SETUP packet includes the binary PID of 1101, the Address field includes the switch's USB address, the Endpoint is "0", and the cyclic redundancy check (CRC) may be a predetermined number of bits (e.g., 5 bits).

The SETUP packet 800 is followed by the DATA packet 801. The DATA packet includes the binary PID of 011, the Data field starting with the "03 0D 07" that indicates that the requested port is Port 7 (i.e., 0x0D+Port number). The CRC field may be 5 bits.

The acknowledgement from the switch is an ACK packet 802. The ACK packet 802 includes only the binary PID. If the requested Port 7 is available, the switch sends a binary 0010 as the PID as positive acknowledgement. If the port is not available, the PID is binary 1010 as a negative acknowledgement (NAK).

Figure 9:
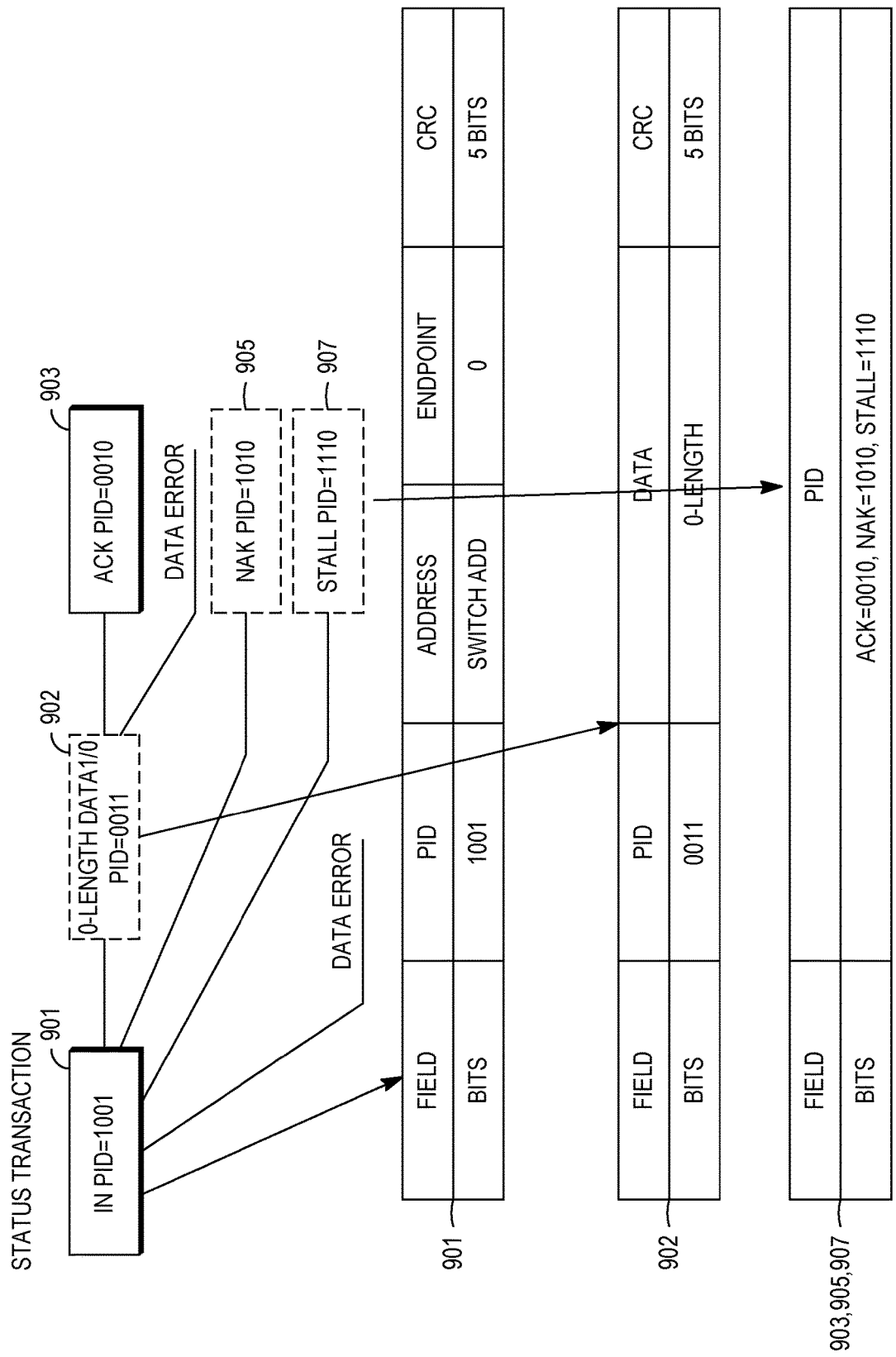
FIG. 9 is a Status Transaction for the CONNECT_PORT connection request, according to the embodiment of FIG. 8.

FIG. 9 is a STATUS Transaction for the CONNECT_ PORT connection request, according to the embodiment of FIG. 8. If the requested port is available, the transfer becomes a write transfer and ends with the Status Transaction of FIG. 9.

The Status Transaction comprises an IN packet 901 with a binary PID of 1001 that is transmitted to the switch. The switch responds with the 0-Length data packet 902 with binary PID of 0011 to which the host responds with an acknowledgement packet 903 with a binary PID of 0010.

Transmission of a negative acknowledgement NAK 905 means the switch did not receive the IN packet.

FIG. 9 shows that the IN packet 901 includes the binary PID field of 1001, the Address field with the switch's USB address, an Endpoint field of "0" and a CRC field of 5 bits.

The 0-Length data packet 902 includes the binary PID field of 0011 since the Data field is 0-Length. The CRC field is 5 bits.

The ACK 903, NAK 905, or STALL 907 packets include the binary PID field of ACK=0010, NAK=1010, or STALL=1110, depending on the response to be sent.

The STALL packet 907 may be sent when an error occurs with the endpoint. The STALL packet 907 is typically an indication that the switch needs intervention by the host.

If the port is not available, a Data Transaction follows the Setup Transaction. FIG. 10 is a Data Transaction for the CONNECT PORT connection request when the port is not available, according to the embodiment of FIG. 8. During this transaction, the switch sends a bitmap representation of the switch connection table that indicates availability of the switch ports.

The Data Transaction comprises an IN packet 1002 with a binary PID of 1001 being transmitted to the switch. The switch responds with a DATA packet 1003 having a binary PID of 0011 to which the host responds to the switch with an ACK packet 1005 having a binary PID of 0010. The switch may also respond with a NAK packet 1007 having a binary PID of 1010 or a STALL packet 1009 having a binary PID of 1110 if the switch cannot be returned to availability or an error occurred, respectively.

FIG. 10 shows that the IN packet 1002 includes the binary PID field of 1001, the Address field of the switch's USB address, an Endpoint field of "0", and a CRC of 5 bits.

The DATA packet 1003 includes the binary PID field of 0011, the Data field of the length of the data plus the bitmap of available switch ports, and a CRC of 5 bits. The length of the data refers to the size of the port bitmap in bytes. The bitmap of the available switch ports may be defined by a binary value that includes a bit position that represents each port in the switch. In an embodiment, a logical "1" in a position indicates that the port is available while a logical "0" in that position indicates that the port is not available. Another embodiment may use the opposite logic.

The ACK 1005, NAK 1007, or STALL 1009 packets include the binary PID field of ACK=0010, NAK=1010, or STALL=1110, depending on the response to be sent.

The read control transfer ends with a Status Transaction. The Status Transaction is a standard USB Status Transaction as illustrated in FIG. 9.

FIGS. 11A and B are Control Write (FIG. 11A) and Control Read (FIG. 11B) transfers, according to example embodiments. After a Setup transaction (e.g., SETUP, DATA0, ACK) as described previously, if the requested port is available, the transfer becomes a Control Transfer and ends with a status transaction as shown in FIG. 11A.

The Status Transaction of the Control Transfer includes an IN packet 1100 with a binary PID of 1001 that is transmitted to the switch. The switch responds with the 0-Length data packet 1101 with binary PID of 0011 to which the host responds with an acknowledgement packet 1103 with a binary PID of 0010. The ACK 1103, NAK 1105, or STALL 1107 packets include the binary PID field of ACK=0010, NAK=1010, or STALL=1110, respectively, depending on the response to be sent as described previously.

FIG. 11B shows the Data Transaction and Status Transaction when the CONNECT_PORT request is negative. It becomes a Control Transfer since the host is going to be reading available ports from the switch.

The Data Transaction of the Control Transfer includes an IN packet 1110 with a binary PID of 1001 that is transmitted to the switch. The switch responds with the DATA0 packet 1113 having a PID field of 0011 to which the host responds with the ACK packet 1115 having a PID field of 0010. The switch may respond to the IN packet 1110, as previously described, with NAK or STALL packets 1117, 1119 having respective PID fields of 1010 and 0010.

The Status Transaction for the Control Transfer looks the same as the Status Transaction of FIG. 11A. For example, the Status Transaction includes an IN packet 1120 with a binary PID of 1001 that is transmitted to the switch. The switch responds with the 0-Length data packet 1123 with binary PID of 0011 to which the host responds with an acknowledgement packet 1125 with a binary PID of 0010. The ACK 1125, NAK 1127, or STALL 1129 packets include the binary PID field of ACK=0010, NAK=1010, or STALL=1110, respectively, depending on the response to be sent as described previously.

Figure 12:
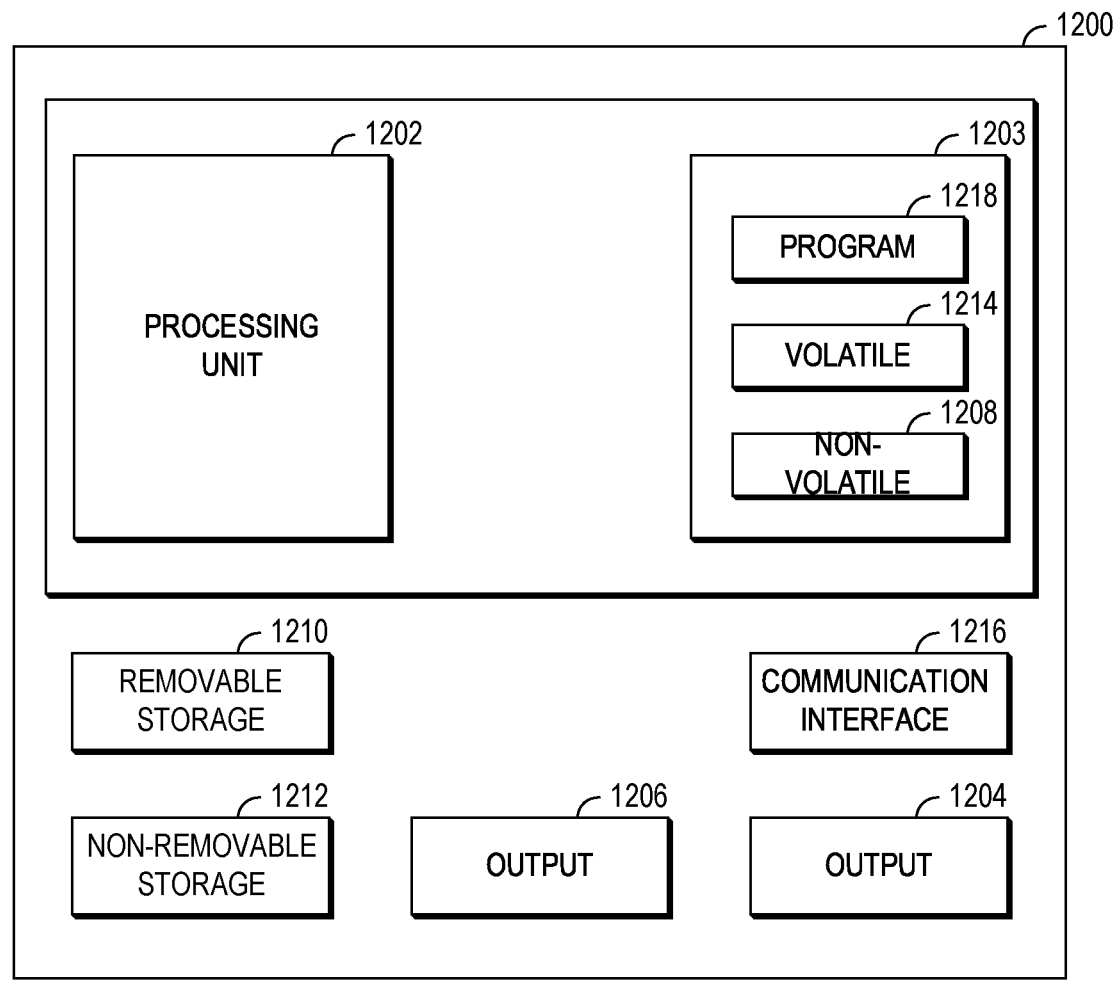
FIG. 12 is a block diagram illustrating circuitry for an implementation of a host or a switch controller for executing algorithms and performing methods, according to example embodiments.

FIG. 12 is a block diagram illustrating circuitry for an implementation of a host, a USB device, or a switch controller for executing algorithms and performing methods, according to example embodiments. The USB device, switch controller or host can be implemented as a field programmable gate array (FPGA), an application specific integrated circuit (ASIC), a dedicated central processing unit (CPU), or any other controller circuitry.

All components need not be used in various embodiments. For example, the switch controller may not need removable storage 1210 or a communication interface 1216.

One example computing device in the form of a computer 1200 may include a processing unit 1202, memory 1203, removable storage 1210, and non-removable storage 1212. Although the example computing device is illustrated and described as computer 1200, the computing device may be in different forms in different embodiments.

Memory 1203 may include volatile memory 1214 and non-volatile memory 1208. Computer 1200 may include—or have access to a computing environment that includes—a variety of computer-readable media, such as volatile memory 1214 and non-volatile memory 1208, removable storage 1210 and non-removable storage 1212. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

The computer 1200 may include or have access to a computing environment that includes an input 1206, an output 1204, and a communication connection 1216. The output 1204 may include USB device ports in a switch embodiment. The input 1206 may include host ports in a switch embodiment.

Computer-readable instructions stored on a computer-readable medium are executable by the processing unit 1202 of the computer 1200. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage such as a storage area network (SAN) indicated at 1220.

Figure 13:
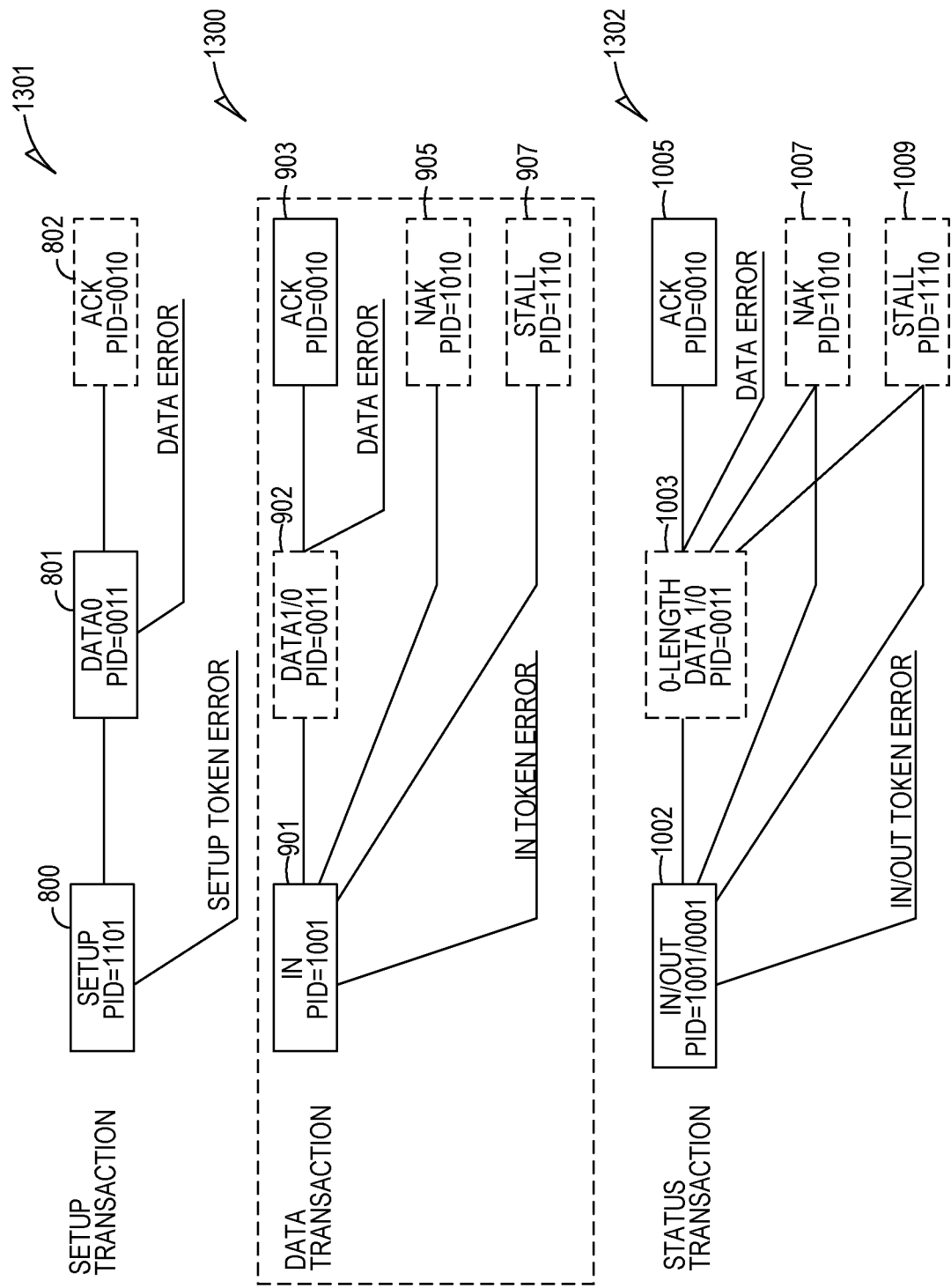
FIG. 13 is an overall description of the transactions to operate the USB network switch, according to example embodiments.

FIG. 13 is an overall description of the transactions to operate the USB network switch, according to example embodiments. This diagram summarizes the above-described transactions in one figure: the Setup Transaction 1301 of FIG. 8, the Data Transaction 1300 of FIG. 9, and the Status Transaction 1302 of FIG. 10. The Data Transaction 1300 may be an optional transaction if the port is not available, as described previously. This figure is provided for convenience purposes in understanding the overall operation of the USB network switch.

In the previous description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A Universal Serial Bus (USB) port switch comprising:
   a host port configured to connect to a host;
   a plurality of USB device ports, each USB device port coupleable to a plurality of USB devices;
   a switch matrix coupled between the host port and the plurality of USB device ports, the switch matrix configured to selectively switch the host port to a USB device port of the plurality of USB device ports; and
   a switch controller coupled to the host port and the switch matrix, the switch controller configured to, in response to a host request for a requested USB device port, perform operations comprising:
      if the requested USB device port is available, acknowledging the host request;
      if the requested USB device port is not available, transmitting a listing of available USB device ports to the host;
      controlling the switch matrix to selectively connect the requested USB device port to the host port; and
      updating a switch table representing the connection of the requested USB device port to the host port.

2. The port switch of claim 1, further comprising a plurality of host ports, each host port configured to connect to a different respective host.

3. The port switch of claim 2, further comprising a plurality of USB interfaces, each USB interface coupled between a respective host port and the switch matrix, each USB interface comprises:
- a hub repeater configured to repeat a signal between the respective host port and the selectively connected USB device port; and
- a transaction translator configured to translate data between a lower USB standard and a higher USB standard.

4. The port switch of claim 1, wherein the switch controller further comprises memory configured to store the switch table.

5. The port switch of claim 1, wherein the host request comprises an address of the switch controller, an identifier of the requested USB device port, and a cyclic redundancy check (CRC) value for the host request.

6. The port switch of claim 1, wherein the host request comprises a first packet that indicates an address of the switch controller and a second packet that indicates the requested USB device port.

7. The port switch of claim 1, wherein the transmitting of the listing of available USB device ports comprises transmitting a bitmap of ports representing the listing of available USB device ports.

8. The port switch of claim 1, wherein each of the plurality of USB device ports is coupleable to 126 USB devices.

9. A Universal Serial Bus (USB) switch in a network of switches, each USB network switch comprising:
- a plurality of host ports each configured to be coupled to a respective host;
- a plurality of USB device ports, each USB device port configured to be coupled to a respective plurality of USB devices;
- a plurality of USB interfaces, each USB interface coupled to a different respective host port and comprising a hub repeater to repeat a signal from a respective host port a switch matrix and a transaction translator to translate between a lower USB standard and a higher USB standard;
- the switch matrix coupled between the plurality of USB interfaces and the plurality of USB device ports; and
- a switch controller coupled to the plurality of USB interfaces, the plurality of host ports, and the switch matrix, the switch controller comprising a processor coupled to non-transitory memory comprising instructions wherein the processor is configured to execute the instructions to, in response to a host request for a requested USB device port, perform operations comprising:
  - if the requested USB device port is available, acknowledging the host request;
  - if the requested USB device port is not available, transmitting a listing of available USB device ports to the requesting host;
  - controlling the switch matrix to connect the requested USB device port to the host port of the requesting host through a respective USB interface; and
  - updating a switch table representing the connection of the requested USB device port to the host port of the requesting host.

10. The USB network switch of claim 9, wherein the network of switches further comprises a plurality of levels of USB network switches, a first level including a first USB network switch wherein the plurality of USB device ports are each configured to be coupled to a respective USB network switch that is part of a second level of USB network switches.

11. The USB network switch of claim 9, wherein the network of switches further comprises a first host coupled to a plurality of USB network switches.

12. The USB network switch of claim 11, wherein each of the plurality of USB network switches is configured to be enumerated as a USB device to the first host.

13. The USB network switch of claim 12, wherein each of the plurality of USB network switches is assigned a USB address.

14. A method for connecting a USB network switch to a host, the method comprising:
- detecting connection to the host at a host port;
- receiving a connect port request for connecting the host port to a first USB device port of a plurality of USB device ports;
- based on the first USB device port not being available, transmitting a listing of available USB device ports to the host;
- receiving a second connect report request for connecting the host port to a second USB device port of the plurality of USB device ports; and
- based on the second USB device port being available:
  - transmitting an acknowledgement;
  - switching the host port to the first USB device port; and
  - updating a USB switch table with the switch to the first USB device port.

15. The method of claim 14, further comprising the USB network switch being enumerated as a USB device with the host such that the USB network switch is assigned a USB device address.

16. The method of claim 15, wherein the connect port request comprises an identifier of the first USB device port.

17. The method of claim 16, further comprising:
- receiving a second connect port request that comprises a port number representing a port disconnect.

18. The method of claim 17, further comprising:
- disconnecting the host port from the first USB device port in response to the port number representing the port disconnect.

19. The method of claim 14, wherein the connect port request comprises a first packet that indicates an address of a switch controller and a second packet that indicates the first USB device port.

* * * * *